US009846354B2

(12) United States Patent
Matoba et al.

(10) Patent No.: US 9,846,354 B2
(45) Date of Patent: Dec. 19, 2017

(54) PROJECTION VIDEO DISPLAY DEVICE WITH RAISABLE/LOWERABLE MIRROR

(71) Applicant: Hitachi Maxell, Ltd., Ibaraki-shi, Osaka (JP)

(72) Inventors: Kosuke Matoba, Tokyo (JP); Atsushi Ishibashi, Tokyo (JP); Toshiyuki Moriya, Tokyo (JP); Takafumi Ishizu, Yokohama (JP); Kazuomi Kaneko, Yokohama (JP); Koji Hirata, Ibaraki (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 14/913,986

(22) PCT Filed: Sep. 13, 2013

(86) PCT No.: PCT/JP2013/074890
§ 371 (c)(1),
(2) Date: Feb. 23, 2016

(87) PCT Pub. No.: WO2015/037137
PCT Pub. Date: Mar. 19, 2015

(65) Prior Publication Data
US 2016/0209739 A1 Jul. 21, 2016

(51) Int. Cl.
*G03B 21/14* (2006.01)
*G03B 21/28* (2006.01)
(Continued)

(52) U.S. Cl.
CPC .......... *G03B 21/28* (2013.01); *G03B 21/145* (2013.01); *G03B 21/30* (2013.01); *H04N 9/3173* (2013.01)

(58) Field of Classification Search
CPC ...... G03B 21/145; G03B 21/28; G03B 21/30; H04N 9/3173
See application file for complete search history.

(56) References Cited

U.S. PATENT DOCUMENTS

2013/0235355 A1* 9/2013 Hirata .................... G03B 21/16
353/58

FOREIGN PATENT DOCUMENTS

CN 103080836 A 5/2013
JP 11-119343 A 4/1999
(Continued)

OTHER PUBLICATIONS

Office Action dated Sep. 27, 2016 for Japanese Patent Application No. 2015-536402.
(Continued)

*Primary Examiner* — Sultan Chowdhury
*Assistant Examiner* — Magda Cruz
(74) *Attorney, Agent, or Firm* — Miles & Stockbridge P.C.

(57) ABSTRACT

A projection video display device, which enlarges and projects an image from an image-displaying means, has a housing and a raisable/lowerable mirror and a power supply, a light source, and a lens unit inside the housing. The raisable/lowerable mirror covers a projection-light opening formed in the top surface of the housing and able to rotate with respect to the housing, and has a convex mirror on the inside surface thereof. The raisable/lowerable mirror covering the top surface of the housing forms a smoothly connected, smooth, convexly curved surface with no height difference between the edge of the raisable/lowerable mirror and the front edge of the opening, and a half-bowl-shaped
(Continued)

concavity is formed on at least one side of the raisable/lowerable mirror in the direction of the axis of rotation thereof.

14 Claims, 7 Drawing Sheets

(51) Int. Cl.
 *G03B 21/30* (2006.01)
 *H04N 9/31* (2006.01)

(56) References Cited

FOREIGN PATENT DOCUMENTS

| | | |
|---|---|---|
| JP | 2003-237178 A | 8/2003 |
| JP | 2009-42371 A | 2/2009 |
| JP | 2011-150064 A | 8/2011 |

OTHER PUBLICATIONS

Office Action dated Aug. 26, 2016 for a related Chinese Application No. 201380078916.2.

\* cited by examiner

F I G. 2
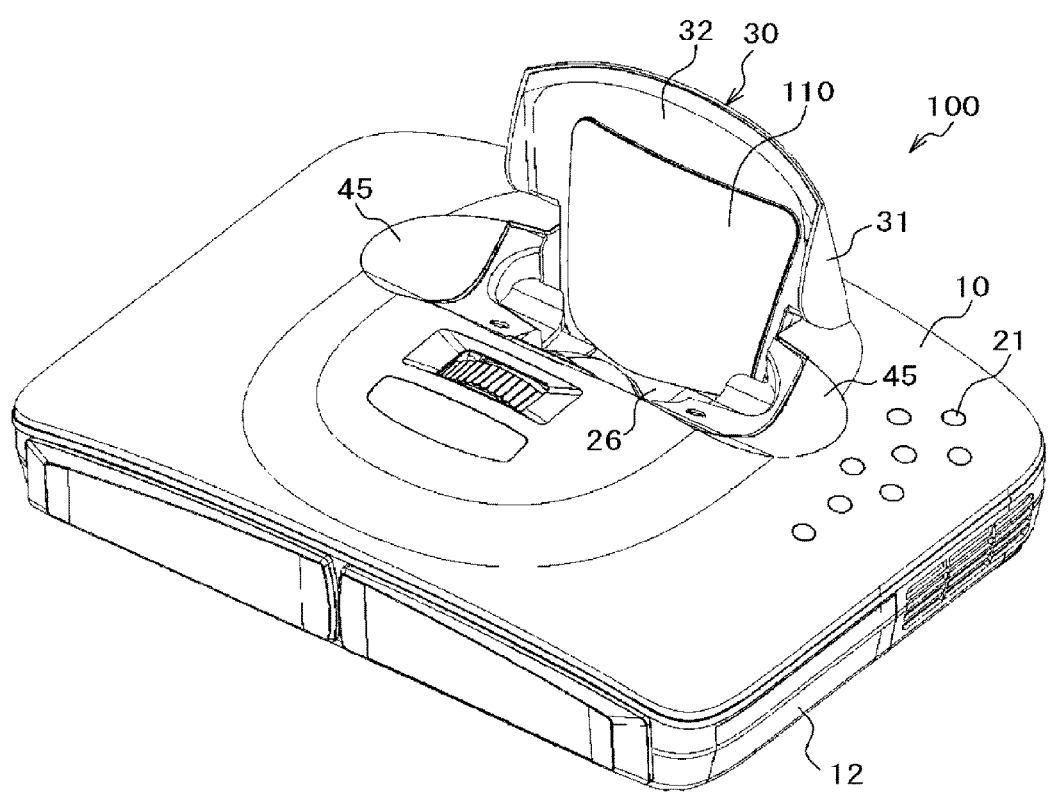

PROJECTION VIDEO DISPLAY DEVICE WITH RAISABLE/LOWERABLE MIRROR

TECHNICAL FIELD

The present invention relates to a projection video display device which enlarges and projects an image from an image-displaying means and, more particularly, to a short-focal-length projection video display device including a raisable/lowerable mirror.

BACKGROUND ART

Examples of a projection video display device (projector device) of the related art are disclosed in Patent Documents 1 to 3. In the projector devices disclosed in the Patent Documents, a mirror of which the back side is substantially plate-shaped is installed on the top surface of the devices in an openable manner. When the projector device is in use, the mirror is opened, and an image is projected in a direction which is different in angle from the mirror surface. When the projector device is not in use, the mirror is closed, a substantially flat surface is formed on the top surface of the projector device. In the projector devices disclosed in Patent Documents 2 and 3, opening and closing of the mirror is automatized by using a driving motor.

CITATION LIST

Patent Document

Patent Document 1: JP 11-119343 A
Patent Document 2: JP 2009-42371 A
Patent Document 3: JP 2011-150064 A

SUMMARY OF THE INVENTION

Problems to be Solved by the Invention

In a short-focal-length projector device, in a case where the projector device is used to be horizontally placed, a projection mirror is positioned to be tilted further than the vertical direction, so that an enlarged image can be provided on a horizontal plane in the vicinity of the projector device.

In a liquid crystal projector device disclosed in Patent Document 1, a raisable/lowerable mirror means by which the top surface of the device becomes almost completely flat in a mirror-closed state is installed. Accordingly, it is possible to prevent the mirror of the liquid crystal projector from being unintentionally opened. However, since the top surface of the projector device becomes almost completely flat, a distance in the height direction is relatively increased due to a relation to an optical system configured with various optical lenses or mirrors, so that further enhancement is required in terms of portability or miniaturization. In addition, in the liquid crystal projector disclosed in Patent Document 1, there is a problem in that it is difficult to perform the opening and closing manually without a grip portion for fingers in the mirror portion.

Projector devices disclosed in Patent Document 2 and 3 are used to be vertically placed, and an enlarged image without distortion is provided from a projection mirror to a horizontal plane. In addition, each of the projector devices includes a driving motor or a control system for opening and closing the mirror in order to open and close the mirror unit. As a result, it is possible to prevent the mirror from being opened unintentionally. However, since a mirror driving system needs to be installed, there is a problem in that the size of the projector device is increased.

The present invention is made in view of the above-mentioned problems and is intended to facilitate opening and closing of a mirror in a mirror-openable projection video display device (projector device) without an increase in size of the device. In addition, the present invention is intended to prevent the raisable/lowerable mirror from being opened and closed unintentionally when the projection video display device is not in use.

Solutions to Problems

To achieve the above-mentioned objects, according to an aspect of the present invention, there is provided a projection video display device which enlarges and projects an image from an image-displaying means, including a housing which encloses a power supply, a light source, and a lens unit which guides light from the light source to the image-displaying means and, after that, enlarges the light, and a raisable/lowerable mirror which covers a projection-light opening formed on a top surface of the housing, is installed to be rotatable with respect to the housing, and has a convex mirror on an inside surface thereof, wherein, when the raisable/lowerable mirror covers the top surface of the housing, a top surface of the projection video display device becomes a convexly curved surface which is smoothly connected with no height difference in an up/down direction between an edge of the raisable/lowerable mirror and a front edge of the opening, and a half-bowl-shaped concavity is formed on at least one side surface in a rotation shaft direction of the raisable/lowerable mirror.

Effects of the Invention

According to the present invention, since a concavity is formed on at least one side surface in a shaft direction of a raisable/lowerable mirror of a projection video display device with respect to a housing, it is possible to facilitate the mirror without an increase in size of the mirror-openable projection video display device (projector device).

BRIEF DESCRIPTION OF THE DRAWINGS

FIG. 2 is a perspective diagram illustrating a mirror-opened state of the projection video display device illustrated in FIG. 1.

MODE FOR CARRYING OUT THE INVENTION

Hereinafter, an embodiment of a projection video display device (projector device) according to the present invention will be described with reference to the drawings.

Figure 1:
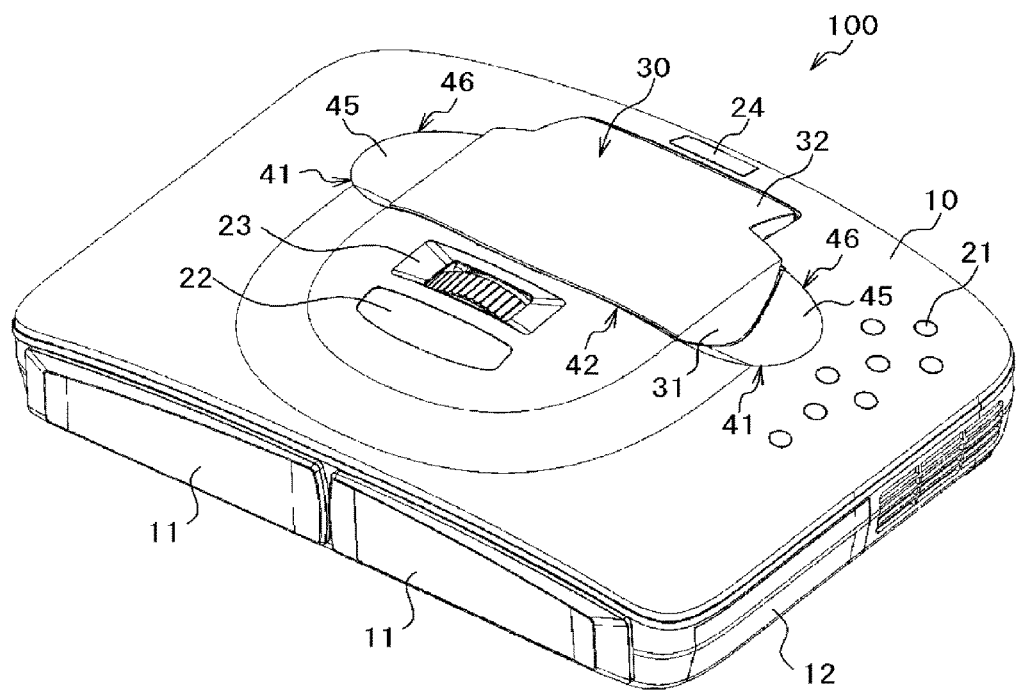
FIG. 1 is a perspective diagram illustrating an embodiment of a projection video display device according to the present invention.

FIGS. 1 and 2 are perspective diagrams illustrating a projection video display device 100 including a raisable/lowerable mirror 30 according to the present invention. FIG. 1 is a diagram where the raisable/lowerable mirror 30 is closed and, thus, a top surface of the housing 10 becomes a smooth surface. FIG. 2 is a diagram where the raisable/lowerable mirror 30 is opened, and thus, the projection video display device 100 is provided for the use thereof.

The projection video display device 100 according to the embodiment is configured to have a size of, for example, A4 or less, so that an enlarged image having a size of 30 to 50 inches is provided in a state where there is no distortion. Since the projection video display device 100 is configured to have a size of A4 or less, its portability is enhanced, and thus, the projection video display device can be adopted for a conference or a business trip. In addition, since opening and closing of a projection mirror portion are manually performed, a driving mechanism is omitted, so that it is possible to miniaturize the projection video display device. More specifically, the device is formed to have a size smaller than A4 size so as to be accommodated in the A4 housing. The device has a box shape having a length of about 270 mm in the longitudinal direction (rotation shaft direction of the raisable/lowerable mirror 30), a length of about 200 mm in the transverse direction, and a length of about 70 mm in the thickness direction and a rounded shape having no angled portions so as to be easy to carry. In addition, as illustrated in FIGS. 1 and 2, the projection video display device 100 can be used to be horizontally placed, or the projection video display device can be used to be vertically placed by setting the leg portion 11 to be in a lower side. In a case where the projection video display device is used to be horizontally placed, a vertical plane such as a wall surface can be used as an image plane. In a case where the projection video display device is used to be vertically placed, a horizontal plane such as a table surface can be used as an image plane.

In the state where the projection video display device 100 is horizontally placed and the raisable/lowerable mirror 30 is closed, there is almost no protrusion on the top surface of the housing 10 of the projection video display device 100, and the top surface has a shape where a central portion thereof is swollen overall. In the swollen central portion of the housing 10, a focus adjustment knob 23 which adjusts the focus of a lens set 83 described later in detail and a human sensor 22 which is disposed in the front side of the focus adjustment knob 23 are installed. The focus adjustment knob 23 is of a dial type, and the focus is adjusted by tracing a finger in the left and right directions. The human sensor 22 is used by an operator of the projection video display device 100 in a case where the operator performs a page turning operation or the like by gesture. In addition, the human sensor 22 is not necessarily installed.

A remote controller light-receiving portion 24 is installed in the rear side of the raisable/lowerable mirror 30 which is disposed to cover the opening 26 of the housing 10. An input signal from a remote controller (not shown) is incident on the remote controller light-receiving portion. By doing so, an image which is to be projected can be controlled. A plurality of touch-panel-type operation units 21 are installed in one side of the raisable/lowerable mirror 30 as the top surface of the housing 10. The touch-panel-type operation units 21 are used to turn on/off a power supply or to correct a position of projection image.

A power source inlet into which a power cable is inserted in a case where AC power is supplied from a commercial power source to the projection video display device 100 is installed on the left side surface of the projection video display device 100. A suction/exhaustion opening for suctioning and exhausting air for cooling the inner portion of the housing 10, a terminal 12 for input an image to be projected and displayed by the projection video display device 100 from the outside, and the like are installed on the right side surface thereof. In addition, on the bottom surface or the back surface, suction/exhaustion openings (not shown) for cooling air are installed. On the bottom surface, corner knobs 15 (refer to FIG. 4A) capable of adjusting an installation angle of the projection video display device 100 are attached.

Herein, the housing 10 and the raisable/lowerable mirror 30 constitute a connection portion at the front edge of the opening 26 of the housing 10 and an upper edge 42 of the raisable/lowerable mirror 30. In the central portion of the housing 10 including the connection portion, the upper side of the entire housing 10 has a convex shape, and in the connection portion, there is no height difference in the up/down direction. The length of the openable edge portion of the raisable/lowerable mirror 30 in the horizontal direction is determined according to the size of a convex mirror 110 described later, and the edge thereof in the horizontal direction has a shape which the edge is bent substantially at a right angle.

Namely, side surfaces 31 are formed at two edges of the raisable/lowerable mirror 30, and concavities 45 are formed between the side surface 31 and the surfaces which are continuous with the opening 26 of the top surface of the housing. The concavity 45 is formed to have a half bowl shape and, as described later, the concavity is used as a grip space when an operator opens or closes the raisable/lowerable mirror 30. The concavity 45 is partitioned by two curves as large as the housing 10. There are a front edge portion 41 constituting the front side of the concavity 45 and a rear edge portion 46 constituting the back side thereof.
This shape will be described later in detail.

When the operator opens the raisable/lowerable mirror 30 outward by using a rotating mechanism (not shown), the convex mirror 110 is retained to be tilted backward by a predetermined angle from the vertical direction. In order to retain the convex mirror, a mirror fixing hinge 112 is installed in the vicinity of the lower side of the raisable/lowerable mirror 30 inside the housing 10 (refer to FIG. 5).

The convex mirror 110 is retained by the mirror cover 32 inside the raisable/lowerable mirror 30. The convex mirror 110 is a reflection mirror (free-form curved surface mirror) of which central portion is protruded outward and is rotationally asymmetric. The outer shape of the convex mirror 110 is a trapezoidal shape where a top side is longer than a bottom side and corners are rounded.

Figure 3A:
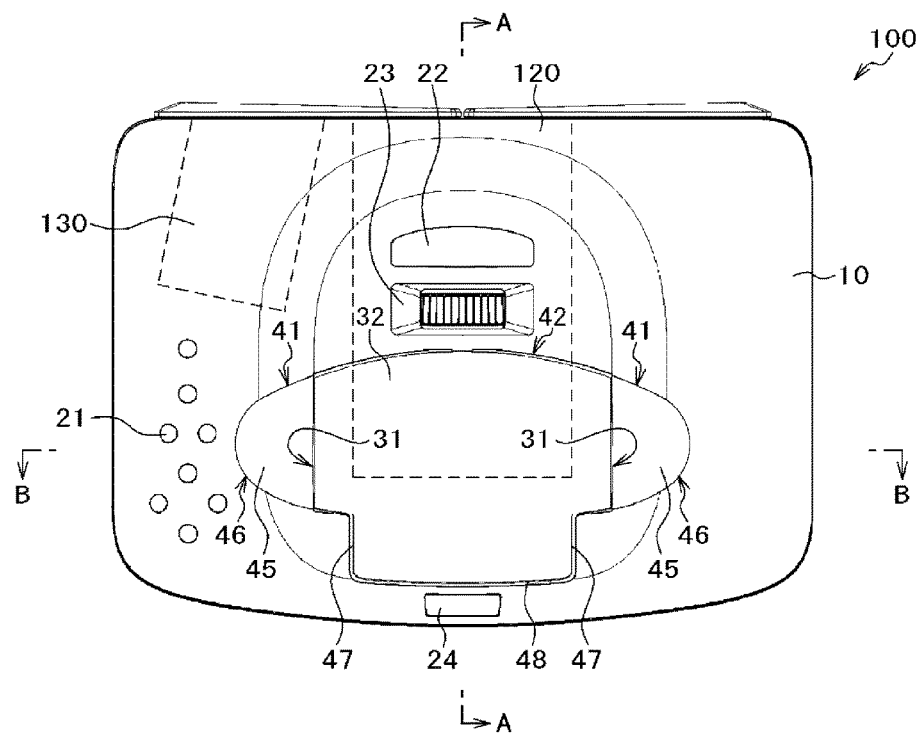
FIG. 3A is a diagram illustrating a top surface of the projection video display device illustrated in FIG. 1.
Figure 3B:
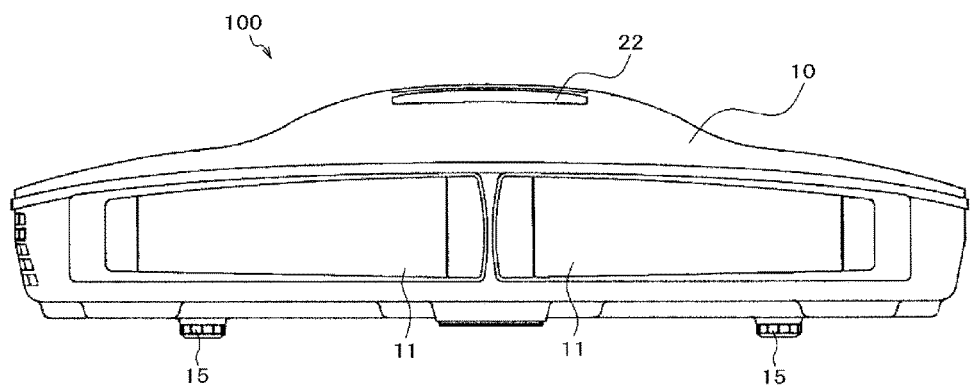
FIG. 3B is a front diagram illustrating the projection video display device illustrated in FIG. 1.
Figure 3C:
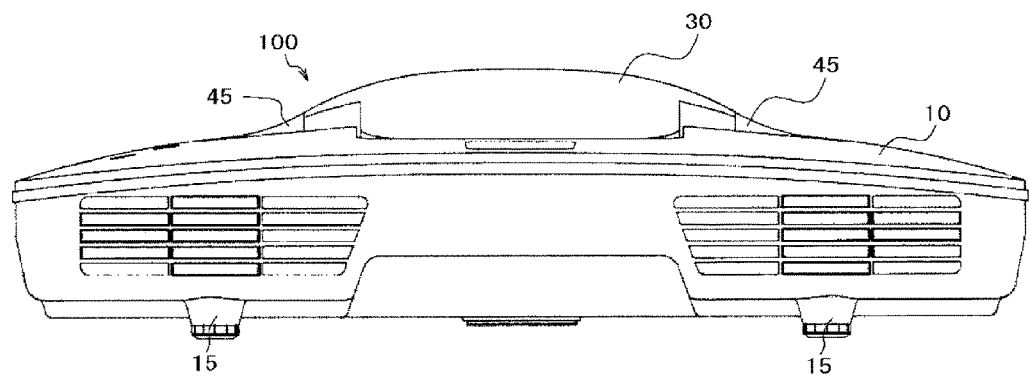
FIG. 3C is a rear diagram illustrating the projection video display device illustrated in FIG. 1.
Figure 4A:
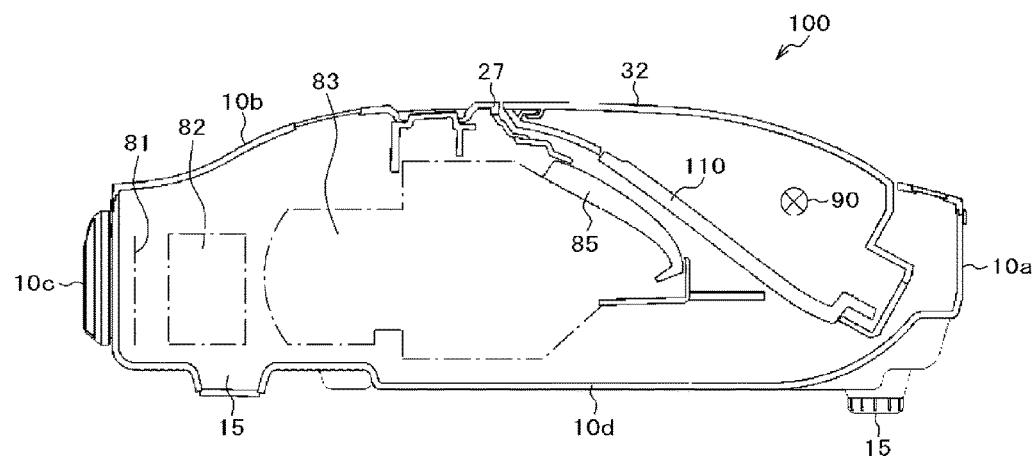
FIG. 4A is a diagram illustrating an outline of a cross section taken along line A-A of FIG. 3.
Figure 4B:
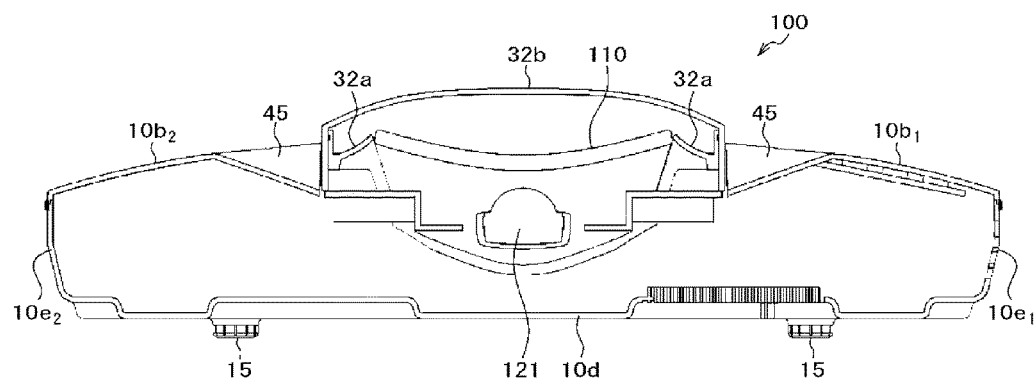
FIG. 4B is a diagram illustrating an outline of a cross section taken along line B-B of FIG. 3.
Figure 4C:
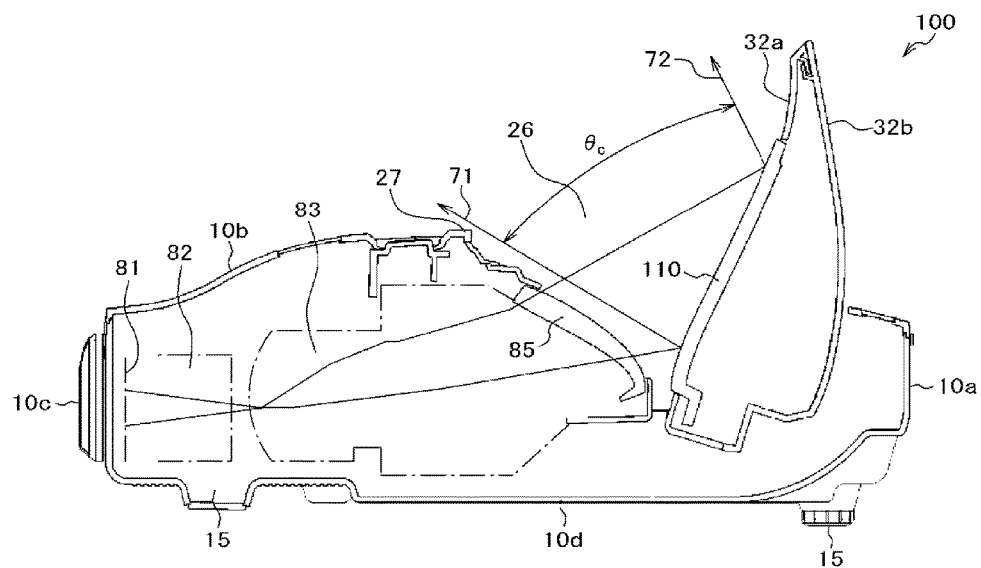
FIG. 4C is a diagram illustrating an outline of a cross section taken along line A-A of FIG. 3 in the mirror-opened state.
Figure 5:
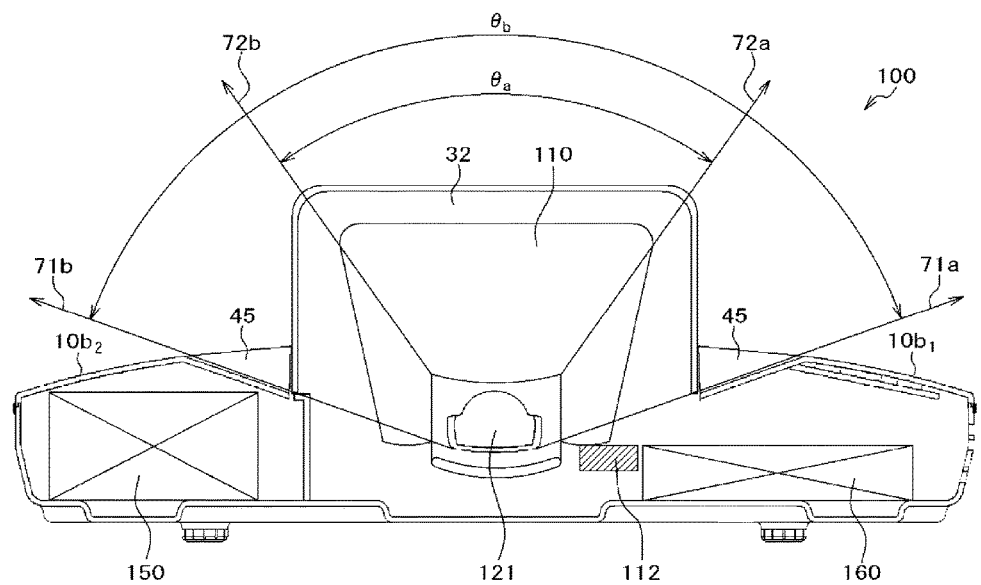
FIG. 5 is a front cross-sectional diagram illustrating a mirror opening/closing mechanism of the projection video display device illustrated in FIG. 1.

Next, an internal structure of the housing 10 of the projection video display device 100 according to the present invention will be described in brief with reference to FIGS. 3A to 3C, FIGS. 4A to 4C, and FIG. 5. FIG. 3A is a top surface diagram illustrating a case where the projection video display device 100 is horizontally placed, FIG. 3B is a front diagram thereof, and FIG. 3C is a rear diagram. FIG. 4A is a cross-sectional diagram taken along line A-A of FIG. 3A, and FIG. 4B is a cross-sectional diagram taken along line B-B. FIG. 4C is a diagram corresponding to the cross-sectional diagram taken along line A-A of FIG. 3A and illustrating the state where the raisable/lowerable mirror 30 is opened. In addition, FIGS. 4A to 4C are illustrated mainly by outlines. FIG. 5 is a diagram corresponding to FIG. 4B and illustrating the state where the raisable/lowerable mirror 30 is opened.

As illustrated in FIG. 3A, an optical system 120 which is extended from the front side end in the central portion in the longitudinal direction to the central portion of the raisable/lowerable mirror 30 is disposed inside the housing 10 of the projection video display device 100. An LED illumination unit 130 including a light source is disposed at one side of the optical system 120. A cooling means is disposed in front of the LED illumination unit 130, that is, under the touch-panel-type operation unit 21. A power supply 150 is disposed at the other side of the optical system (refer to FIG. 5).

The raisable/lowerable mirror 30 is smoothly continuous with the opening 26 of the housing 10 in the connection portion having the upper edge 42 having an arc shape as described above. As illustrated in FIG. 3A, a base portion of the raisable/lowerable mirror 30 is formed with a bottom side portion 48 which is shorter than the upper edge 42 and an erecting portion 47. When the raisable/lowerable mirror 30 is opened to use, the raisable/lowerable mirror 30 is rotated about a rotation shaft 90 illustrated in FIG. 4A by a rotating mechanism (not shown). Herein, the rotation shaft 90 is located between the top surface 10b of the housing 10 and the bottom surface 10d and between the mirror cover 32 and the bottom surface 10d in the height direction inside the housing in the state where the raisable/lowerable mirror 30 is closed as illustrated in FIG. 4A.

Since the rotation shaft is defined as illustrated in FIG. 4A, as illustrated in FIG. 4C, the base portion of the raisable/lowerable mirror 30 is rotated inside the space formed with respect to the back side 10a of the housing 10 and is concealed into the inner portion thereof. As a result, the lower end portion of the convex mirror 110 and the lower end portion of the projection lens 85 can be set to be substantially at the same height. More strictly speaking, lower limit light 71 as light at the lower limit side of the projection light passing through the lens unit 83 can be reflected in the vicinity of the lower limit of the convex mirror 110.

In this embodiment, when the raisable/lowerable mirror 30 is to be closed, the base portion of the raisable/lowerable mirror 30 is moved upward; and when the raisable/lowerable mirror 30 is to be opened, the base portion is moved downward. Therefore, in comparison with a case where the raisable/lowerable mirror 30 is rotated at the base portion of the raisable/lowerable mirror 30, it is possible to prevent the height of the projection video display device 100 from being increased.

As illustrated in the longitudinal cross section in FIG. 4B, in the state where the raisable/lowerable mirror 30 is closed, the concavity 45 is excepted, and thus, the top surface of the housing 10 becomes a curved surface where the mirror cover 32b of the raisable/lowerable mirror 30 is connected to the left and right housing top surfaces $10b1$ and $10b2$. In addition, as illustrated in FIGS. 3B and 3C, the top surface of the housing 10 and the raisable/lowerable mirror 30 are connected to each other smoothly, which forms a shape capable of preventing the raisable/lowerable mirror 30 from being opened unintentionally at the time of carrying the device or the like. In the inner sides of the raisable/lowerable mirror 30, the mirror cover 32a retains the convex lens 110 in all the directions. Side surfaces $10_{e1}$ and $10_{e2}$ of the housing are connected to housing top surfaces $10b_1$ and $10b_2$, respectively to form a suction/exhaustion slit or like for the cooling means.

The overview of optical system 120 will be described with reference to FIGS. 4A and 4C. Light from the light source configured with a semiconductor laser included in the LED illumination unit 130 is modulated by a transmission-type light modulating device (image-displaying means) 81 configured with a liquid crystal panel or the like according to an image signal (for example, an image signal from a mobile terminal) from the outside. In addition, the image-displaying means 81 may be configured as a reflection-type configured with a micromirror or a reflection-type liquid crystal panel. In a case where the transmission-type, in general, the three image-displaying means 81 are used. However, in FIG. 4C, for the simplification, only one image-displaying means is illustrated. The image-displaying means 81 is disposed in the vicinity of the front side 10c of the housing 10.

The image obtained by the image-displaying means 81 is combined by a TIP prism 82 and is projected through a lens unit 83 configured with a plurality of lenses from a projection lens 85 to the convex mirror 110. The projection light passing through the projection lens 85 is reflected on the surface of the convex mirror 110 to be enlarged and projected.

In addition, the above-described lens unit 83 configured with the plurality of lenses is configured to include various lenses including a lens which has an asymmetrical, free-form curved surface shape and is required to correct various distortions associated with the enlarging projection of the image, for example, a distortion caused by tilt incidence or a trapezoidal distortion. In addition, the lens unit 83 is movably mounted on a base (not shown). Focus performance is adjusted by moving a portion of the lenses or a lens group of the lens unit 83 in the up/down direction of FIG. 4C by manipulating the focus adjustment knob 23 installed in the upper portion of the housing 10 is manipulated.

The projection light which is projected from the image-displaying means 81 through the prism 82 and the lens unit 83 from the projection lens 85 to the convex mirror 110 is reflected on the convex mirror 32. Therefore, an image is formed within a range θc between the lower limit light 71 and the upper limit light 72 in FIG. 4C. The light reflected on the convex mirror 32 is projected, for example, on a surface of a screen, a wall, a desk, a table, or the like to form image light.

As clearly understood from FIG. 4C, the projection video display device 100 does not influence the optical path of the upper limit light 72 as the upper limits of the projection light emitted from the projection lens 85 and the reflection light reflected on the convex lens 110. On the other hand, the lower limit light 71 reflected on the convex lens 110 passes through the vicinity of the front edge portion 27 of the opening 26 in order to miniaturize the projection video display device 100. In order words, the front edge 17 of the opening 26 is formed to have such a size that the interference with the lower limit light 71 can be avoided.

Although the optical path in the up/down direction of the projection image is described heretofore, the optical path in the horizontal direction of the projection image needs to be secured. The horizontal enlargement of the optical path of the reflection light reflected on the convex lens 110 will be described with reference to FIG. 5. The enlargement of the light emitted from a lens 121 constituting the lens unit 83 is illustrated. In order to obtain an image without distortion, the lower limit light requires a space corresponding to only an angle θb between left limit light 71b and right limit light 71a as an optical path. On the other hand, the upper limit light requires a space corresponding to only an angle θa between left limit light 72b to right limit light 72a as an optical path.

Similarly to the case of the up/down direction, in the horizontal direction, the optical paths of the upper limit light 72a and the upper limit light 72b are not blocked by the projection video display device 100. On the other hand, the lower limit light 71a and lower limit light 71b interfere with the top surface of the housing 10 in the side portions of the raisable/lowerable mirror 30. The concavity 45 is formed by cutting the interference portions, so that the lower limit light 71a and lower limit light 71b can reproduce a good image without distortion on a screen or the like.

Therefore, the shape of the concavity 45 becomes a mortar shape according to a curved surface of the side surface 31 of the raisable/lowerable mirror 30 and the top surface 10b1 and 10b2 of the housing 10 and a shape of the optical paths of the lower limit light 71 (71a and 71b). In addition, although the rear edge portion 46 of the concavity 45 is not directly associated with the shape of the optical path, since the concavity 45 is used as a grip space at the time of manipulating the raisable/lowerable mirror 30, the rear edge portion is formed to have a shape according to a size of fingers.

As described above, since the optical system configured with the convex mirror 110 and the lens unit 83 including the free-form curved surface lens is employed, although the distance from the projection video display device 100 to the image projection surface is short, projection performance capable of displaying a sufficiently enlarged image without distortion is secured. For example, in a case where the image is projected in the state where the projection video display device 100 is disposed in the state where the distal end portion thereof is in contact with the image projection surface, a screen of 29 7 inches×18 5 inches (screen size of diagonal 35 inches; 16:10) can be obtained.

Figure 6:
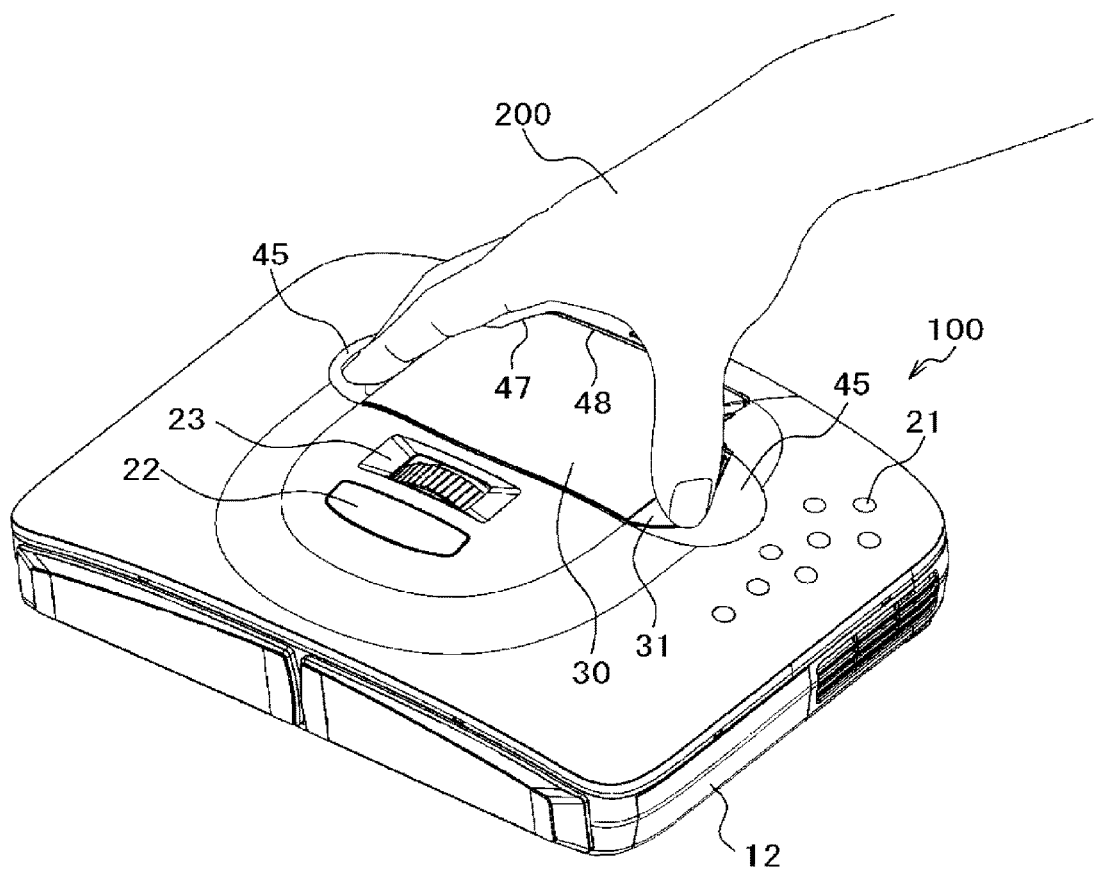
FIG. 6 is a perspective diagram illustrating a mirror opening operation (operation before the mirror is opened) in the projection video display device illustrated in FIG. 1.
Figure 7:
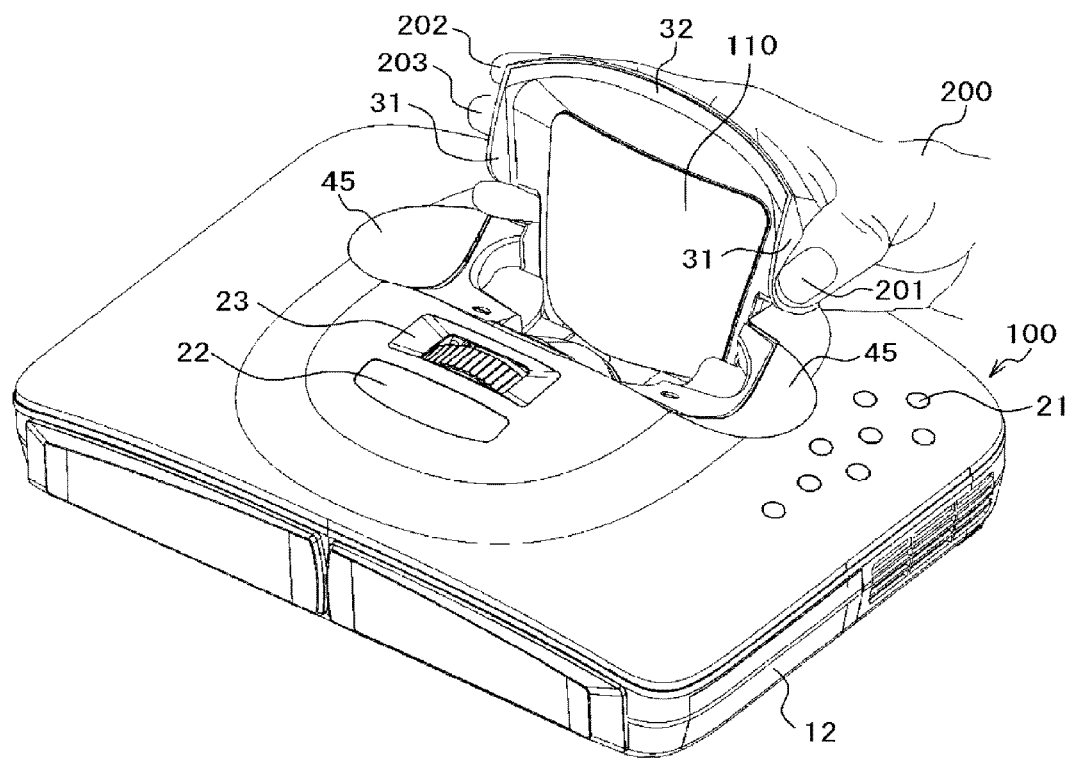
FIG. 7 is a perspective diagram illustrating a mirror opening operation (operation after the mirror is opened) in the projection video display device illustrated in FIG. 1.

Next, opening and closing operations of the raisable/lowerable mirror 30 will be described with reference to FIGS. 6 and 7. FIG. 6 is a perspective diagram illustrating an operation state immediately before the raisable/lowerable mirror 30 is opened, and FIG. 7 is a perspective diagram illustrating the state where the raisable/lowerable mirror 30 is opened by a predetermined angle.
In these figures, manipulation of the right hand is illustrated. However, it is obvious that the manipulation can be performed by the left hand.

An operator 200 grips the cover side surface 31 from the touch-panel-type operation unit 21 side of the raisable/lowerable mirror 30 with the thumb 201 by using the one concavity 45 and grips the other cover side surface 31 of the raisable/lowerable mirror 30 with an index finger 202, a middle finger 203, a ring finger or the like by using the other concavity 45. Next, the raisable/lowerable mirror 30 is rotated by using a rotating mechanism (not shown) to the position where the raisable/lowerable mirror is stopped by the mirror fixing hinge 112. In a case where the raisable/lowerable mirror 30 is to be closed, the reverse operation is performed. By doing so, although the operation is manually performed, the position of the convex mirror 110 is securely fixed and retained, and a stable projection image can be obtained.

According to the embodiment, the projection video display device includes an openable raisable/lowerable mirror, the raisable/lowerable mirror can be allowed to be manually manipulated, and the rotation shaft of the raisable/lowerable mirror is installed inside the projection video display device, so that any driving means for rotation is unnecessary, and thus, it is possible to miniaturize the projection video display device. In addition, since the concavity is formed between the raisable/lowerable mirror and the housing top surface and the connection portion between the housing and the raisable/lowerable mirror is formed to be a smooth curved surface, it is possible to prevent the raisable/lowerable mirror from being opened unintentionally. Accordingly, in the carrying of the projection video display device, it is possible to completely prevent occurrence of problems in that stationery or the like enters into the space between the housing and the raisable/lowerable mirror and, thus, the convex mirror is destructed.

In addition, in the above-described configuration, slight concave portions are installed in the left and right cover side surfaces 31 which are used as the grip portions of the raisable/lowerable mirror 30, so that finger gripping can be securely obtained. In addition, in the state where the raisable/lowerable mirror is closed, the upper edge of the convex mirror and the upper edge of the projection lens as the final stage of the lens unit may be set to be substantially at the same height. By doing so, it is possible to miniaturize the projection video display device. Furthermore, preferably, the maxim length of the raisable/lowerable mirror in the rotation shaft direction is set to be such a length that the operator can grip the projection video display device by using only one hand. Although the length of the raisable/lowerable mirror in the rotation shaft direction is defined according to the optical path of the reflection light reflected on the convex mirror, if the magnitude thereof is, for example, about 10 cm, a sufficient image can be implemented, and the operator can grip the device.

In addition, in the above-described embodiment, the optical system is disposed at the substantially central portion in the longitudinal direction of the housing, and the power source and the LED illumination unit are disposed at the respective two sides thereof. However, the optical system may be disposed at the one end side in the longitudinal direction, and the power source and the LED illumination unit may be disposed in the opened space. In this case, although only one concavity is formed on the top surface of the housing, the thumb or the other fingers may be used to grip the raisable/lowerable mirror by using the one concavity. In addition, if the other side surface of the raisable/lowerable mirror is used as a grip means in a similar manner, it is possible to obtain the same effects as those of the above-described embodiment.

The embodiments disclosed in this specification are exemplary ones, but the invention is not limited thereto. The scope of the invention is defined by the claims, and all modified examples in the scope are included in the invention.

REFERENCE SIGNS LIST

10 Housing
10a Rear side
10b to 10b$_2$ Front side cover
10c Front side

10d Bottom surface
$10e_1$, $10e_2$ Side surface
11 Leg portion
12 Terminal portion
15 Corner knob
21 Touch-panel-type operation unit
22 Human sensor
23 Focus adjustment knob
24 Remote controller light-receiving portion
26 Opening
27 Front edge portion
30 Raisable/lowerable mirror
31 Cover side surface
32 to 32b Mirror cover
41 Concavity front edge portion
42 Mirror upper edge
45 Concavity (interference avoiding portion)
46 Concavity rear edge portion
47 Erecting portion
48 Bottom side portion
71 to 71b Lower limit light
72 to 72b Upper limit light
81 Image-displaying means
82 Prism
83 Lens unit
85 Projection lens
90 Mirror rotation center
100 Projection video display device
110 Convex mirror
112 Mirror fixing hinge
120 Optical system
121 Lens
130 LED illumination unit
150 Power supply
160 Cooling means
200 Operator's finger
201 Thumb
202 Index finger
203 Middle finger
θa Upper limit light left/right image range
θb Lower limit light left/right image range
θc Vertical image range

The invention claimed is:

1. A projection video display device which enlarges and projects an image from an image-displaying means, comprising:
a housing which encloses a power supply, a light source, and a lens unit which guides light from the light source to the image-displaying means and, after that, enlarges the light; and
a raisable/lowerable mirror which covers a projection-light opening formed on a top surface of the housing, is installed to be rotatable with respect to the housing, and has a convex mirror on an inside surface thereof,
wherein, when the raisable/lowerable mirror covers the top surface of the housing, a top surface of the projection video display device becomes a convexly curved surface which is smoothly connected with no height difference in an up/down direction between an edge of the raisable/lowerable mirror and a front edge of the opening, and a half-bowl-shaped concavity is formed on at least one side surface in a rotation shaft direction of the raisable/lowerable mirror.

2. The projection video display device according to claim 1, wherein the raisable/lowerable mirror is formed to have a surface where two side surfaces in the rotation shaft direction are extended in an up/down direction, the concavities are formed with the two side surfaces of the raisable/lowerable mirror and the top surface of the housing, so that the two side surfaces can be used as grip portions at the time of manually rotating the raisable/lowerable mirror.

3. The projection video display device according to claim 2, wherein concave portions gripped by fingers of an operator of the projection video display device are formed on the two side surfaces.

4. The projection video display device according to claim 1, wherein a front edge portion of the opening formed on the top surface of the housing is formed is the vicinity of lower limit light at an outer side of an image range from an optical path of the lower limit light of reflection light which passes through the lens unit and is reflected on the convex mirror of the raisable/lowerable mirror when the raisable/lowerable mirror is opened.

5. The projection video display device according to claim 2, wherein a maximum length of the raisable/lowerable mirror in the rotation shaft direction is such a length that an operator can grip the projection video display device by only one hand.

6. The projection video display device according to claim 3, wherein a maximum length of the raisable/lowerable mirror in the rotation shaft direction is such a length that an operator can grip the projection video display device by only one hand.

7. The projection video display device according to claim 4, wherein a maximum length of the raisable/lowerable mirror in the rotation shaft direction is such a length that an operator can grip the projection video display device by only one hand.

8. The projection video display device according to claim 4, wherein a front edge side of the concavity formed on the side surface of the raisable/lowerable mirror is formed in the vicinity of the lower limit light at the outer side of the image range from the optical light of the lower limit light.

9. The projection video display device according to claim 8, wherein a maximum length of the raisable/lowerable mirror in the rotation shaft direction is such a length that an operator can grip the projection video display device by only one hand.

10. The projection video display device according to claim 4, wherein a shape of a bottom surface of the concavity formed on the side surface of the raisable/lowerable mirror is formed in the vicinity of the lower limit light at the lower side of the image range from the optical path of the lower limit light of the reflection light reflected on the convex mirror of the raisable/lowerable mirror.

11. The projection video display device according to claim 10, wherein a maximum length of the raisable/lowerable mirror in the rotation shaft direction is such a length that an operator can grip the projection video display device by only one hand.

12. The projection video display device according to claim 1, wherein a position of a center of rotation of the raisable/lowerable mirror is defined inside the housing so that an upper edge of the convex mirror and an upper edge of a projection lens as a final stage of the lens unit are set to be substantially at the same height in the state where the raisable/lowerable mirror is closed.

13. The projection video display device according to claim 12, wherein a maximum length of the raisable/lowerable mirror in the rotation shaft direction is such a length that an operator can grip the projection video display device by only one hand.

14. The projection video display device according to claim 1, wherein a maximum length of the raisable/lowerable mirror in the rotation shaft direction is such a length that an operator can grip the projection video display device by only one hand.

* * * * *